United States Patent
Ouamane et al.

(10) Patent No.: US 12,208,588 B2
(45) Date of Patent: Jan. 28, 2025

(54) MOLD WITH SECTORS FOR TIRES, IN PARTICULAR TIRES FOR AGRICULTURAL VEHICLES, AND ASSOCIATED MOLDING METHOD

(71) Applicant: COMPAGNIE GENERALE DES ETABLISSEMENTS MICHELIN, Clermont-Ferrand (FR)

(72) Inventors: Luc Ouamane, Clermont-Ferrand (FR); Philippe Cealis, Clermont-Ferrand (FR); Stephane Chaland, Clermont-Ferrand (FR); Florian Ferriere, Clermont-Ferrand (FR); Romain Viard, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 631 days.

(21) Appl. No.: 17/416,142

(22) PCT Filed: Dec. 12, 2019

(86) PCT No.: PCT/EP2019/084830
§ 371 (c)(1),
(2) Date: Jun. 18, 2021

(87) PCT Pub. No.: WO2020/126798
PCT Pub. Date: Jun. 25, 2020

(65) Prior Publication Data
US 2022/0063220 A1  Mar. 3, 2022

(30) Foreign Application Priority Data

Dec. 19, 2018 (FR) ...................................... 1873393

(51) Int. Cl.
*B29D 30/06* (2006.01)

(52) U.S. Cl.
CPC .... *B29D 30/0629* (2013.01); *B29D 2030/063* (2013.01)

(58) Field of Classification Search
None
See application file for complete search history.

(56) References Cited

U.S. PATENT DOCUMENTS 1,870,255 A * 8/1932 Krause ............... B29D 30/0601
425/47
3,704,082 A * 11/1972 Hottle ................ B29D 30/0629
425/46

(Continued)

FOREIGN PATENT DOCUMENTS

EP  1222063 B1 * 2/2006 ......... B29D 30/0629
EP  2897790 A1    7/2015

(Continued)

OTHER PUBLICATIONS

Dalverny F et al. "English Machine Translation of WO 2017/198739 A1: Tyre Vulcanizing Device." 2024. Espacenet. EPO. (Year: 2024).*

(Continued)

*Primary Examiner* — Susan D Leong
*Assistant Examiner* — Jonathan B Woo
(74) *Attorney, Agent, or Firm* — VENABLE LLP

(57) ABSTRACT

The tire mold comprises lower 12 and upper portions 14 which are movable relative to one another between a close-together position for molding the tire and a distanced position for extracting said tire from the mold, and a plurality of central sectors 16 which are in axial contact with the lower 12 and upper portions 14 in their close-together molding position. For each sector 16, the mold comprises an upper member 22 for permanently coupling said sector to the upper portion 14, and a lower member 20 for temporarily coupling said sector to the lower portion 12, said coupling (Continued)

members 20, 22 being configured so as to obtain, during an axial distancing movement of the lower 12 and upper portions 14 from their close-together molding position, a radial displacement of said sector 16 toward the outside followed by an angular pivoting.

16 Claims, 11 Drawing Sheets

(56) References Cited

U.S. PATENT DOCUMENTS

| | | | | |
|---|---|---|---|---|
| 3,760,658 | A * | 9/1973 | Guier | E21B 19/16 |
| | | | | 81/57.34 |
| 3,779,677 | A | 12/1973 | Greenwood | |
| 3,833,323 | A * | 9/1974 | Pasch | B29D 30/0629 |
| | | | | 425/46 |
| 3,854,853 | A * | 12/1974 | Mirtain | B29D 30/0629 |
| | | | | 425/46 |
| 3,989,791 | A * | 11/1976 | Tippin | B29D 30/0629 |
| | | | | 264/315 |
| 4,035,119 | A * | 7/1977 | Beres | B29D 30/0606 |
| | | | | 425/46 |
| 5,208,044 | A * | 5/1993 | Miyata | B29C 33/202 |
| | | | | 425/46 |
| 5,667,812 | A * | 9/1997 | Shimizu | B29D 30/0629 |
| | | | | 425/46 |
| 6,066,283 | A * | 5/2000 | Nara | B29D 30/0629 |
| | | | | 425/46 |
| 9,259,863 | B2 | 2/2016 | Defaisse | |
| 2008/0152742 | A1* | 6/2008 | Bachochin | B29D 30/0629 |
| | | | | 425/46 |
| 2015/0251340 | A1* | 9/2015 | Defaisse | B29C 35/002 |
| | | | | 425/47 |
| 2019/0009486 | A1* | 1/2019 | Massoptier-David | |
| | | | | B29D 30/0605 |

FOREIGN PATENT DOCUMENTS

| | | | | |
|---|---|---|---|---|
| WO | WO-2014086880 A1 * | 6/2014 | | B29D 30/0629 |
| WO | WO-2017198739 A1 * | 11/2017 | | B29D 30/0601 |

OTHER PUBLICATIONS

Alegre G et al. "English Machine Translation of WO-2014086880-A1: Tyre Vulcanizing Mould." 2024. Espacenet. EPO. (Year: 2024).*
International Search Report dated Mar. 26, 2020, in corresponding PCT/EP2019/084830 (4 pages).

* cited by examiner

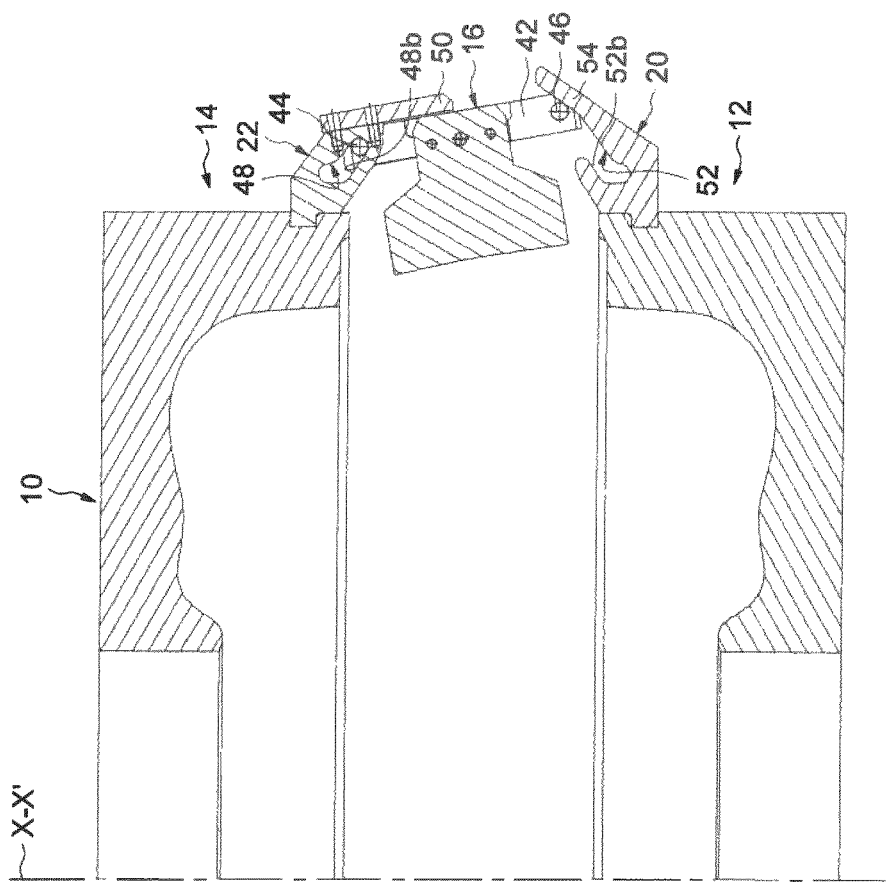
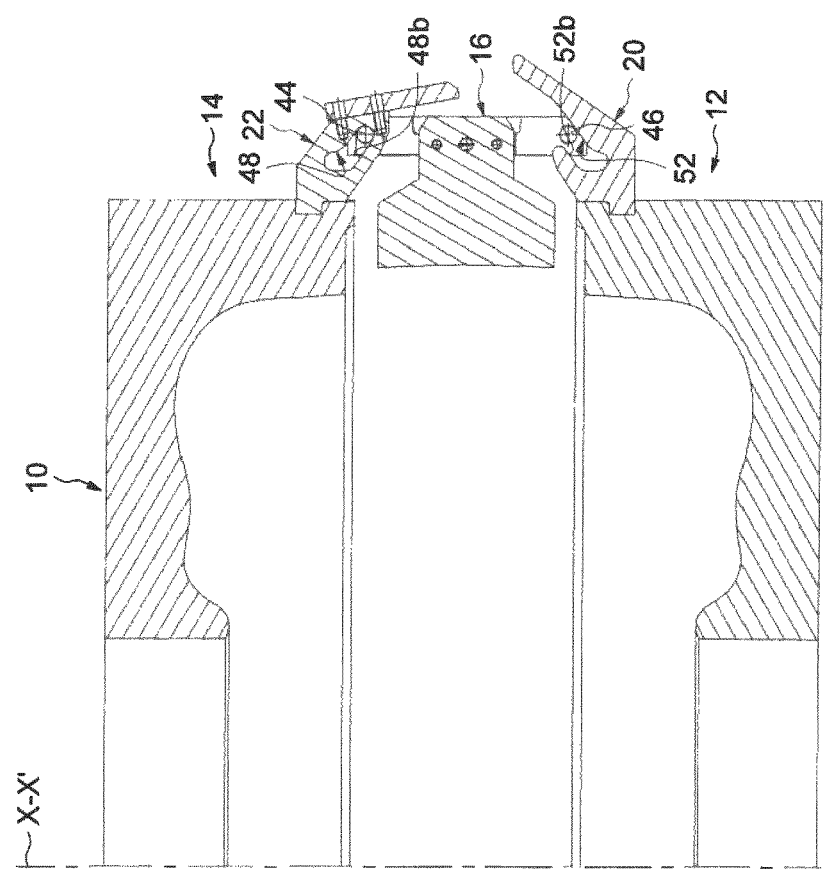

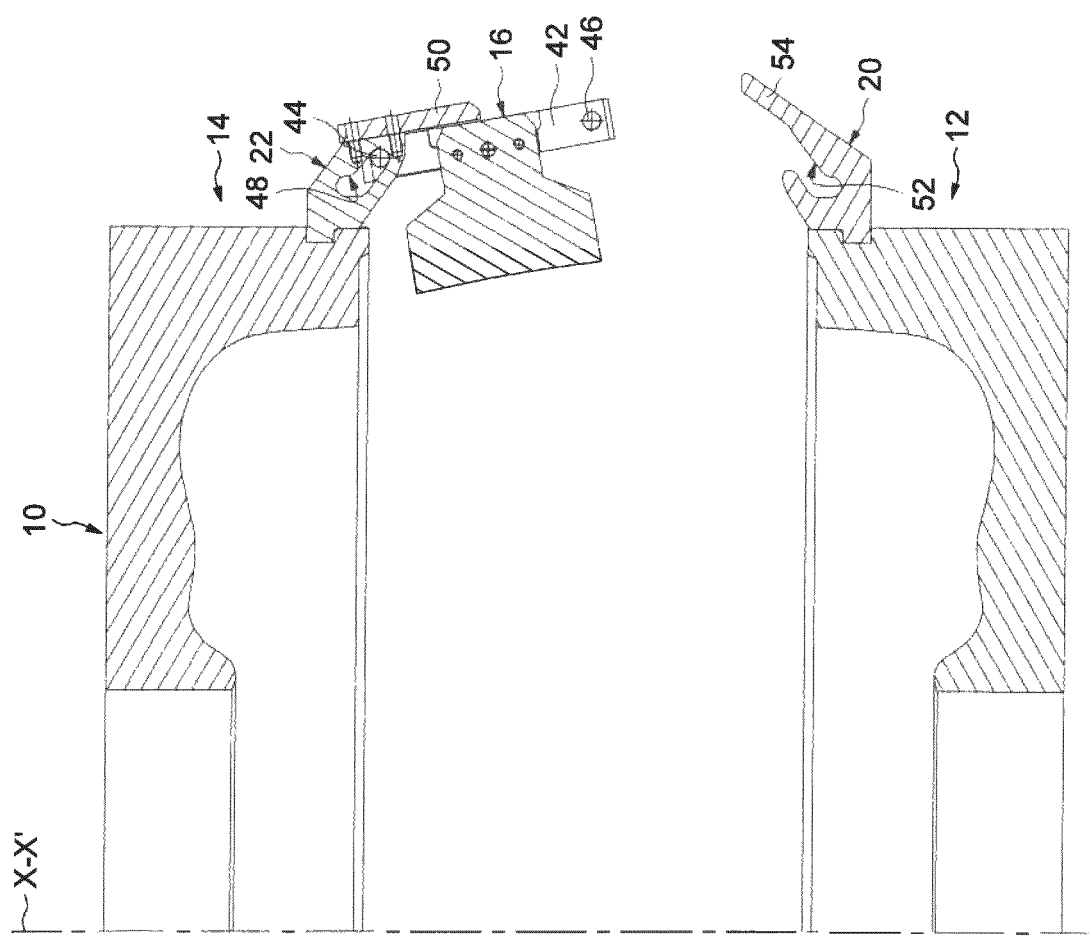

MOLD WITH SECTORS FOR TIRES, IN PARTICULAR TIRES FOR AGRICULTURAL VEHICLES, AND ASSOCIATED MOLDING METHOD

BACKGROUND

The present invention concerns the field of curing or vulcanisation moulds for vehicle tyres, in particular for agricultural vehicles, for example agricultural tractors and agro-industrial vehicles.

An agricultural tyre is intended to run on various types of ground, such as soil of varying compaction in fields, unpaved field access roads, and asphalted road surfaces. In view of the diversity of usage in fields and on the road, an agricultural tyre and in particular its tread must offer a performance compromise which varies depending on use.

In a known fashion, the main lever for managing the performance compromise of an agricultural tyre subjected to a given load is its inflation pressure. In the case of field usage on soil of varying looseness, it is recommended that the tyre be inflated to the lowest possible pressure compatible with its endurance, in particular so as to limit the compacting of the ground during passage of the agricultural vehicle, which promotes the agronomic crop yield. However, in the case of usage on tracks or roads, for example while relocating the agricultural vehicle outside its working zone, a higher pressure is necessary in order to guarantee a good driving behaviour and low rolling resistance.

The tread of an agricultural tyre conventionally comprises two rows of cleats formed by relief elements of globally elongated, parallelepipedic form. The cleats are separated from one another in the circumferential direction by grooves. In order to improve the performance of the tyre, the tread may also comprise in its central part a row of studs or blocks of rubber which, together with the cleats, form the profile of the tyre.

To manufacture an agricultural tyre, a first solution is to use a mould comprising two lower and upper portions which are movable axially relative to one another between a closed mould position, in which the portions come to rest axially on one another, and an open position for extracting the tyre from the mould.

With such a mould, the lower and upper portions thereof ensure the moulding of the tyre tread.

The profiles of agricultural tyres have ever more complex forms in order to optimise performance during use in the field and on the road, which poses problems for extraction from the mould.

Thus in order to manufacture an agricultural tyre, a second solution is to use a mould equipped with a plurality of sectors arranged axially between the lower and upper portions of said mould, in order to ensure moulding of the central portion of the tyre tread. These sectors are connected to the lower and upper portions such that a relative axial movement thereof causes the radial displacement of the sectors. For more details of such a mould with sectors, reference is made for example to European patent EP B1 1 222 063.

However, although such a mould with sectors allows extraction from the mould of more complex shapes for profiles of the tyre tread, it requires the use of actuators to operate the radial displacement of the sectors. Such actuators entail an additional cost and greater maintenance of the machines.

The present invention aims to remedy this drawback.

SUMMARY

The present invention concerns a mould for a tyre of the type comprising a tread and two side walls. The mould comprises lower and upper portions which are intended for moulding at least the side walls of the tyre and are movable at least axially relative to one another between a close-together position for moulding the tyre and a distanced position for extracting said tyre from the mould.

The mould also comprises a plurality of central sectors which are in axial contact with the lower and upper portions in their close-together moulding position and are intended to ensure the moulding of at least a central portion of the tread of said tyre. Said sectors are distributed in the circumferential direction and movable relative to said lower and upper portions.

According to a general characteristic of the mould, the latter furthermore comprises, for each sector, a member for permanently coupling said sector to the upper portion and integral with said upper portion, and a member for temporarily coupling said sector to the lower portion and integral with said lower portion.

The permanent and temporary coupling members associated with each sector are configured so as to obtain:
  during an axial distancing movement of the lower and upper portions from the close-together moulding position, a radial displacement of said sector toward the outside followed by an angular pivoting of said sector towards the outside, under the effect of its own weight, and
  during an axial approaching movement of the lower and upper portions from their distanced position for extraction from the mould, reverse movements of said sector.

Each sector can pivot angularly around an axis perpendicular to said direction of axial and radial displacement of the upper and lower portions of the mould, and perpendicular to the direction of radial displacement of said sector.

A "tyre" means all types of elastic tyres, whether or not subjected to internal pressure.

A "tread" of a tyre means a quantity of rubbery material delimited by two side surfaces and by two main surfaces, one of which—called the rolling surface—is intended to come into contact with a road surface when the tyre is running. The tread comprises a plurality of cutouts which extend onto at least one of the side faces.

A "wall" of a tyre means part of the side surface of a tyre arranged between the tread and a bead of this tyre, starting from the ends of the cutouts of the tread and extending up to the bead.

With the mould according to the invention, when opened, the movement sequence of each sector is composed of a radial retraction movement and then a pivot movement. These two movements are performed successively and autonomously, i.e. without a specific actuator.

Thanks to this double movement of the sectors, the height of the rubber blocks able to be moulded is increased in comparison with the height of the rubber blocks obtained during moulding with conventional two-piece curing moulds.

According to an advantageous particular embodiment of the mould, the lower and upper portions are each provided with a support face in axial contact with a front face of each sector in the close-together moulding position of said portions, and a tapered holding face extending said support face towards the inside and radially engaged against a complementary outer face of each sector in said close-together moulding position.

With such a design, it is not necessary to provide specific means for ensuring that the sectors are held in position in the moulding position, such as an additional external clamping ring radially surrounding the sectors and requiring the use of a specific actuator.

Thus it is possible to mount the mould in a conventional press, for example with a simple vertical opening and closure movement sequence, without specific adaptation of the press.

Although this specific design of the mould is particularly advantageous, it remains however possible, in a variant embodiment, not to provide the gripping of the sectors by the lower and upper portions of the mould in the moulding position. In this case the mould may then comprise an additional external clamping ring, as indicated above, for holding the sectors in position in the moulding position.

To ensure the radial displacements of each sector, each of the permanent and temporary coupling members associated with said sector may comprise a guide groove inside which a finger of said sector is engaged in sliding fashion and which is provided with at least one oblique portion. Advantageously, the finger of each sector engaged in the guide groove of the associated permanent coupling member may form a pivot axis for said sector.

When the mould is produced according to the particular design indicated above, the permanent and temporary coupling members associated with each sector are preferably configured so as to obtain, on axial distancing of the lower and upper portions from their close-together position, the disengagement of said sector from said lower and upper portions before its radial displacement towards the outside. To this end, the guide groove of each of the permanent and temporary coupling members associated with each sector may also be provided with an axial portion for ensuring the disengagement of said sector from the lower and upper portions, the oblique portion of said guide groove extending the axial portion towards the outside.

Preferably, the oblique portion of the guide groove of each temporary coupling member is open at one end.

Also, to return each sector from its pivoted position on closure of the mould, the temporary coupling member associated with said sector may comprise, in the extension of the oblique portion of the guide groove, a protruding portion coming into contact with the finger of said sector during the axial approach of the lower and upper portions.

For reasons of simplicity of manufacture, the permanent and temporary coupling members associated with each sector are preferably fixed to an outer surface of the lower and upper portions respectively.

According to a specific design of the mould, each of the lower and upper portions comprises a ring intended to ensure moulding of a side portion of the tyre tread adjacent to the central portion of said tread, the sectors being axially interposed between the rings of said lower and upper portions in their close-together moulding position.

With this design, the permanent and temporary coupling members associated with each sector are preferably fixed to an outer surface of the rings of the lower and upper portions respectively.

In a particular embodiment, the mould may also comprise means for locking each sector in its pivoted position. This characteristic is optional when the mould is intended to be mounted in a press with a simple, purely vertical opening and closing movement sequence, i.e. without any angular pivoting of the upper portion of said mould combined with the vertical displacement of the lower and upper portions. This characteristic proves particularly advantageous for large tyres, where pivoting allows easier extraction of the tyre.

The locking means may for example comprise at least one permanent magnet fixed on each sector and able to maintain the pivoted position of said sector by the magnetic attraction force exerted on the permanent coupling member associated with said sector. Alternatively, it is possible to provide fixing of the magnet or magnets on the permanent coupling member, and maintain the pivoted position of the associated sector by the magnetic attraction force exerted by the magnet or magnets on said sector.

The invention also concerns a tyre obtained by moulding using a mould as defined above.

The invention furthermore concerns a method for moulding a tyre using a mould as defined above and comprising the following successive steps:

introducing an unvulcanised tyre blank into the mould in the open configuration of the lower and upper portions of said mould, closing the mould by axially bringing together the lower and upper portions of said mould, causing an angular pivoting of the sectors in the clockwise direction followed by a radial movement of said sectors towards the inside, moulding the tyre, opening the mould by axially distancing the lower and upper portions of said mould, causing a radial movement of the sectors towards the outside followed by an angular pivoting of said sectors in the counter-clockwise direction, and extracting the moulded tyre from the mould.

BRIEF DESCRIPTION OF THE FIGURES

The present invention will be better understood from reading the detailed description of an embodiment, given as an example and in no way limitative, and illustrated by the attached drawings on which.

DETAILED DESCRIPTION

Figure 1:
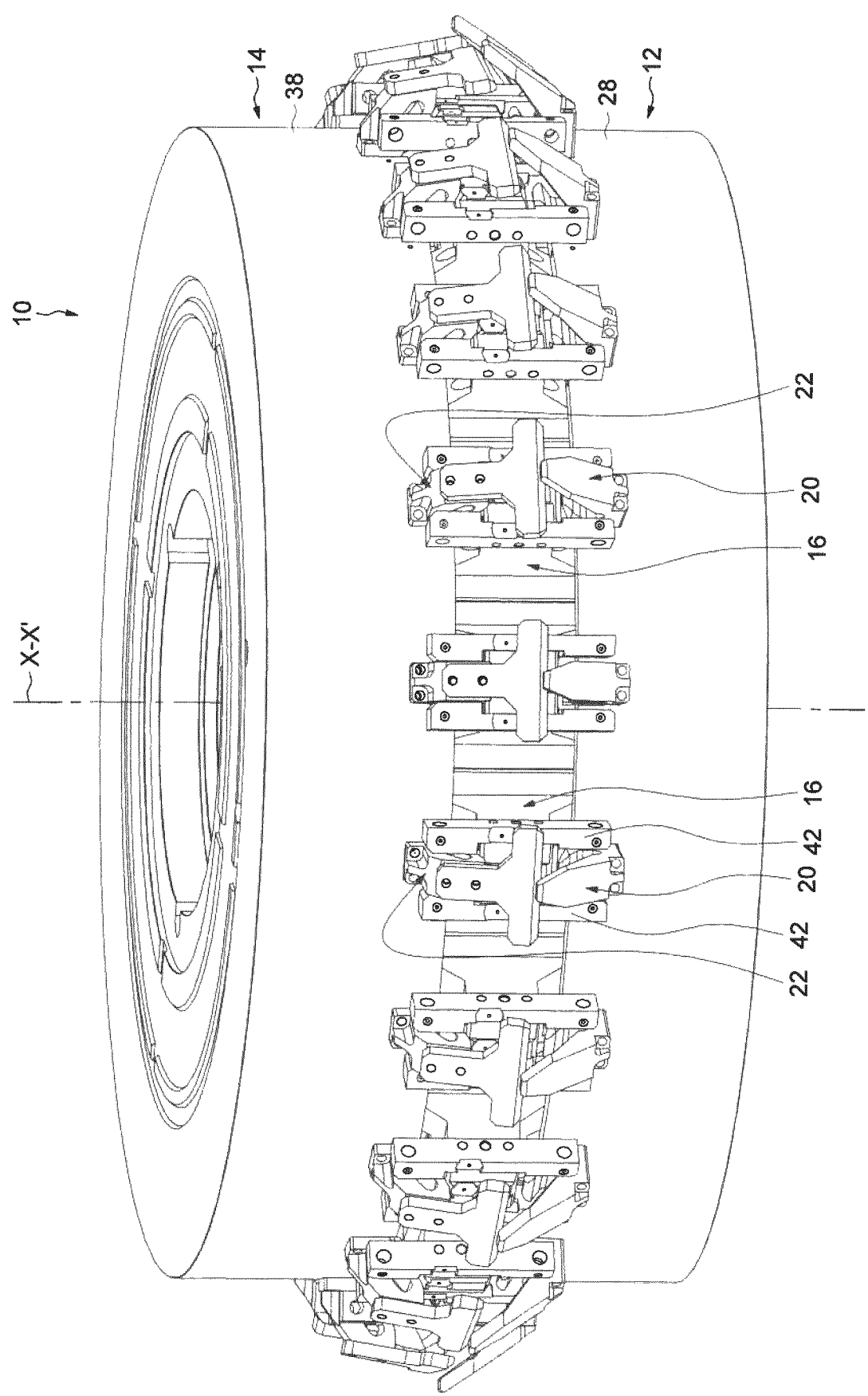
FIG. 1 is a perspective view of a curing mould for a tyre according to an exemplary embodiment of the invention.
Figure 2:
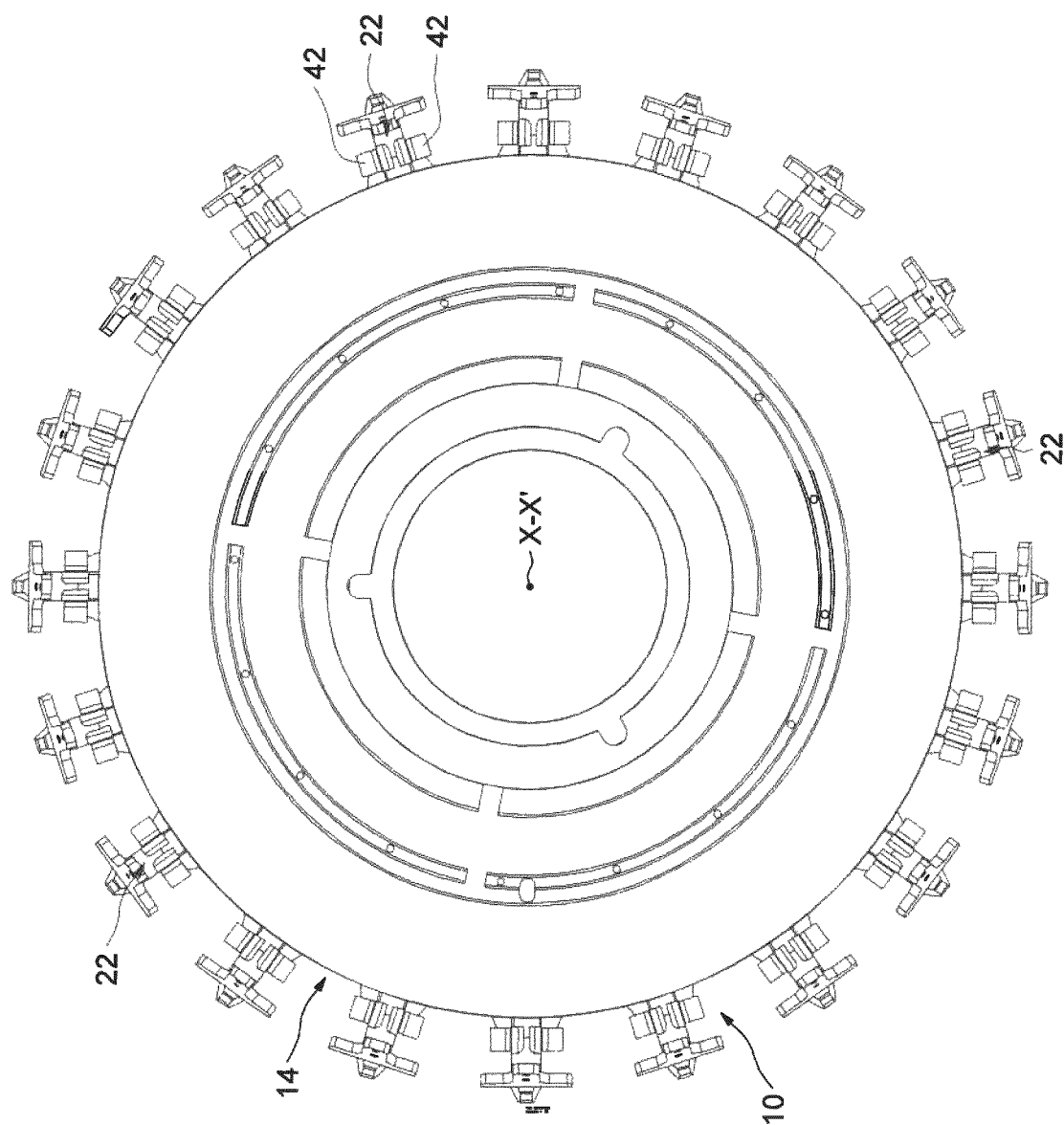
FIG. 2 is a view from above of the mould from FIG. 1.
Figure 3:
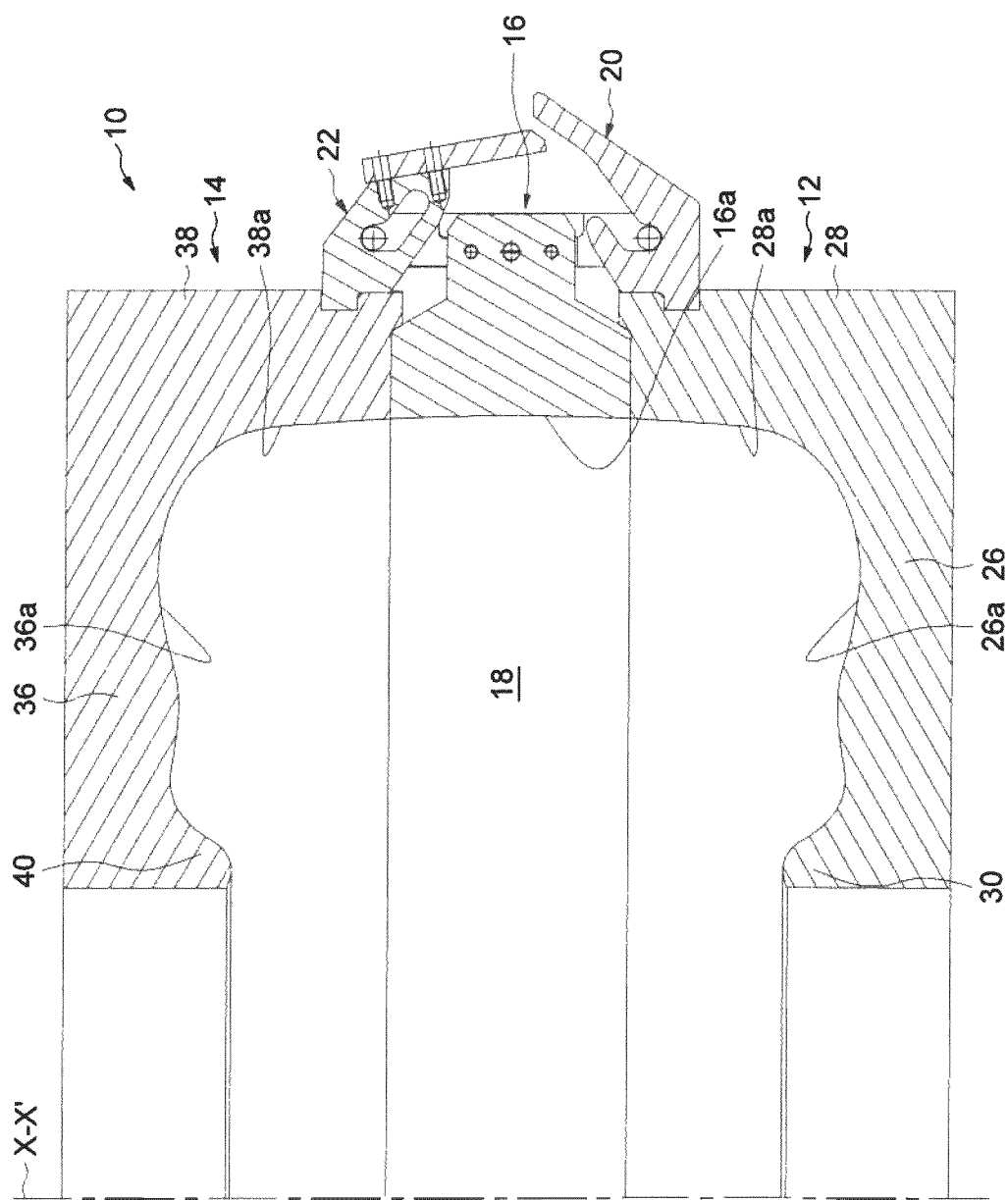
FIG. 3 is a cross-sectional view of the mould from FIG. 1.

FIGS. 1 to 3 show an exemplary embodiment of a mould which is designated 10 as a whole, and intended for curing or vulcanisation of a tyre (not shown) for an agricultural vehicle. After moulding, the tyre is annular in form and comprises a cylindrical tread extended by first and second opposite side walls.

On the figures, the mould 10 is illustrated in an assumed vertical position. Axis X-X' of the mould 10 coincides with the axis of revolution of the tyre.

As illustrated more clearly on FIG. 3, the mould 10 comprises a lower portion 12, an upper portion 14 and a ring of central sectors 16 axially interposed between the lower and upper portions. In the closed position of the mould illustrated in FIG. 3, the lower 12 and upper portions 14 and the plurality of sectors 16 jointly delimit a moulding cavity 18 of the tyre. The closed position of the mould 10 corresponds to the tyre moulding position.

The lower 12 and upper portions 14 and the sectors 16 are centred on axis X-X'. The sectors 16 are circumferentially distributed around said axis. The sectors 16 are mutually identical. The sectors 16 bear one against the other in the circumferential direction. The lower 12 and upper portions 14 and the sectors 16 may be made of metallic material, in particular steel. The sectors 16 may comprise an aluminium moulding insert.

As will be described in more detail below, the mould 10 furthermore comprises, for each sector 16, a pair of lower 20 and upper coupling members 22 for obtaining a displacement of said sector in a particular movement sequence from its moulding position on opening of the mould, and a reverse displacement on closure of said mould. The sectors 16 are movable jointly.

The lower 12 and upper portions 14 of the mould are identical and symmetrical with respect to a radial median plane of the mould 10 perpendicular to axis X-X'.

The lower portion 12 comprises an annular lower shell 26 and an annular lower ring 28 radially surrounding the shell 26. The shell 26 and the ring 28 partially delimit the mould cavity 18. The shell 26 ensures moulding of one of the side walls of the tyre, while the ring 28 ensures moulding of a side portion of the tyre tread adjacent to said side wall. The shell 26 comprises an annular lower face 26a for moulding the side wall of the tyre. The ring 28 comprises an annular inner face 28a for moulding the side portion of the tread.

The lower portion 12 also comprises an annular lug 30 for moulding one of the side beads of the tyre. In the exemplary embodiment illustrated, the shell 26, the ring 28 and the lug 30 are produced as one block. Alternatively, the shell 26, the ring 28 and the lug 30 may be separate parts. The shell 26 and the ring 28 may be fixed to a common plate.

The upper portion 14 is identical to the lower portion 12, so will not be described in detail. In a similar fashion to the lower portion 12, the upper portion 14 comprises an upper shell 36 provided with an inner moulding face 36a, a lower ring 38 provided with an inner moulding face 38a, and a lug 40.

In the closed position of the mould 10, each sector 16 is axially interposed between the rings 28, 38 of the lower and upper portions. Each sector 16 ensures the moulding of a zone of the central portion of the tyre tread. Each sector 16 has an inner face 16a for moulding this zone of the central portion of the tread. The inner faces 16a of the sectors and the inner faces 28a, 38a of the rings of the lower 12 and upper portions 14 ensure the moulding of the tyre tread. These inner faces 16a, 28a and 38a allow the moulding of the profiles of the tyre tread. FIG. 3 does not show the imprint for the profiles of the tread on the inner face 16a of the sector, nor the inner faces 28a, 38a of the rings.

Figure 4:
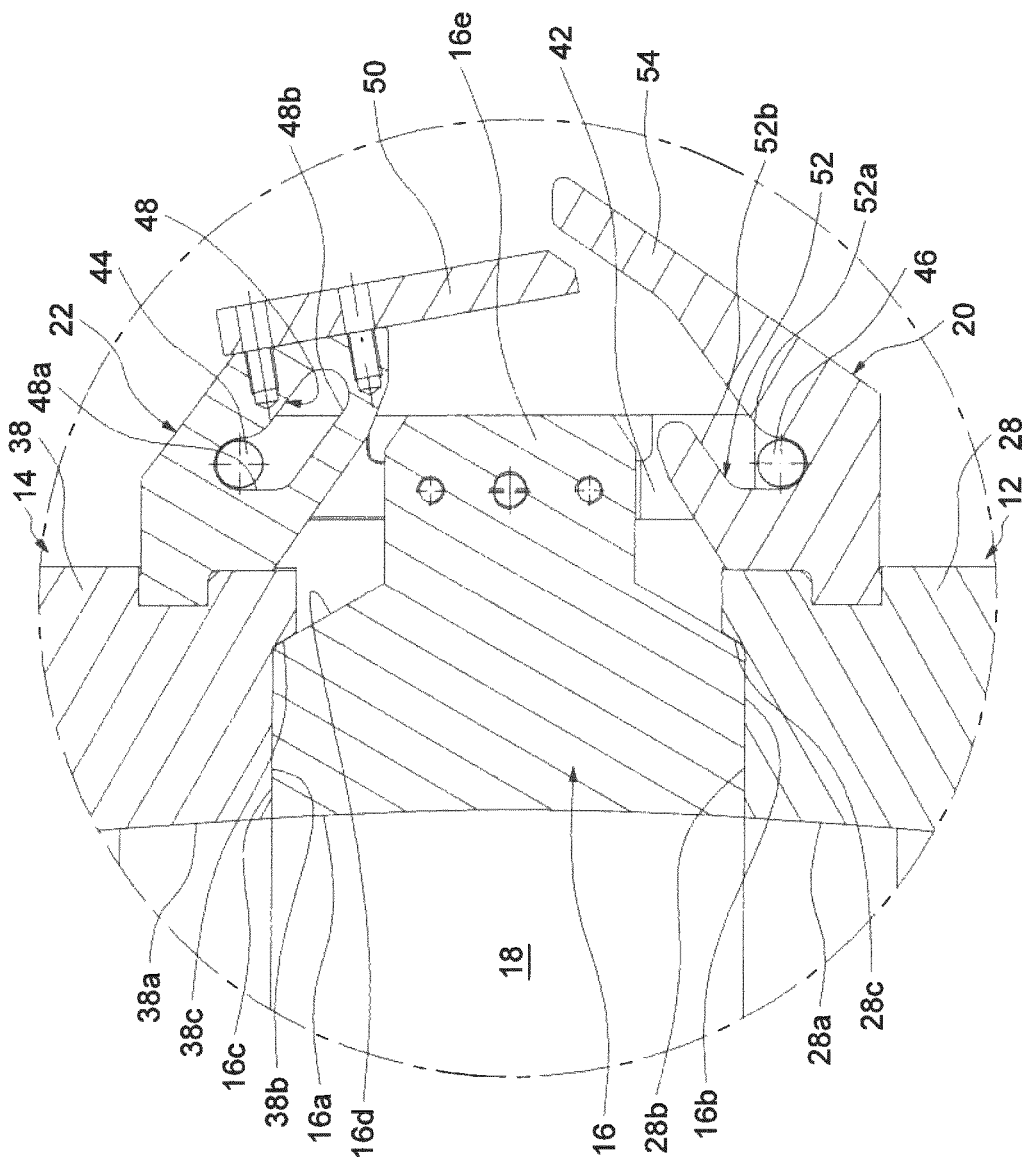
FIG. 4 is a detail view of FIG. 3, FIG. 5, FIG. 6, FIG. 7, FIG. 8, FIG. 9 and FIG. 10 are cross-sectional views illustrating the opening of the mould.
Figure 5:
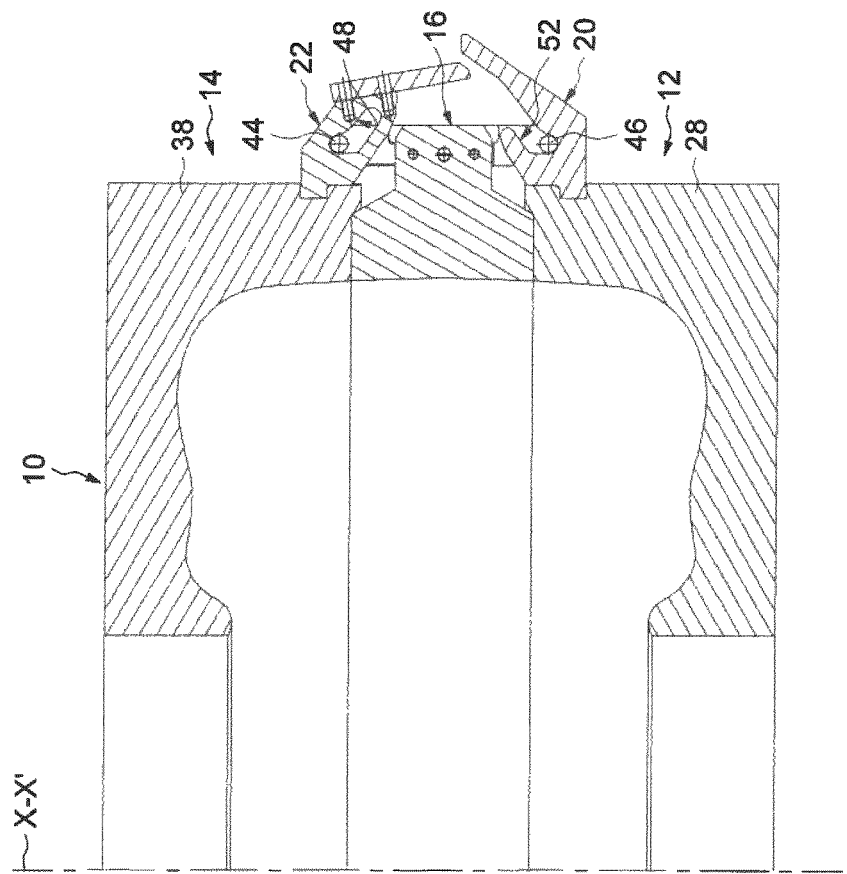

As illustrated more clearly on FIG. 4, each sector 16 comprises two opposite radial lower and upper front faces 16b, 16c which axially delimit the inner face 16a. Each sector 16 also comprises an outer face 16d of tapered form, which lies opposite the inner face 16a in the radial direction.

In the closed position of the mould 10, the ring 28 of the lower portion comes to bear axially against the lower front face 16b of each sector, and the ring 38 of the upper portion comes to bear axially against the upper front face 16c of each sector. Each ring 28, 38 is also radially engaged against the outer face 16d of each sector.

Each ring 28, 38 comprises a radial support face 28b, 38b which radially extends the inner moulding face 28a, 38a and comes to bear axially against the front face 16b, 16c of each sector. Each ring 28, 38 also comprises a tapered holding face 28c, 38c which extends the support face 28b, 38b radially towards the inside and axially towards the outside. The holding face 28c, 38c of each ring 28, 38 comes to bear radially against the complementary outer face 16d of each sector.

Each sector 16 also comprises a fixing flange 16e radially extending the outer face 16d towards the outside. The flange 16e protrudes radially towards the outside relative to the rings 28, 38. Each sector 16 is also equipped with two support uprights 42 fixed on either side of the flange 16e in the circumferential direction. The uprights 42 are situated at a distance from the rings 28, 38.

Each sector 16 also comprises first and second guide fingers 44, 46 extending transversely between the uprights 42. The fingers 44, 46 are axially arranged on either side of the flange 16e of the sector. The fingers 44, 46 extend perpendicularly relative to the axial and radial directions of the mould.

As indicated above, coupling members 20, 22 are associated with each sector 16 for ensuring the movable mounting of said sector relative to the rings 28, 38.

The upper coupling member 22 is fixed to the upper portion 14. The coupling member 22 is fixed to the ring 38 of the upper portion. The coupling member 22 is fixed to the outer surface (not designated) of the ring 38. The coupling member 22 comprises a guide groove 48, inside which the first finger 44 of the associated sector extends. The groove 48 comprises a vertical, rectilinear, axial portion 48a which is extended at a lower end by an oblique portion 48b that extends downward on the side opposite the ring 38. The groove 48 is oblong. The grooves 48 here passes through the thickness of the upper coupling member 22. The groove 48 is delimited in the width direction by two mutually facing opposite side walls, and in the length direction by two opposite end walls that are here of rounded form.

In the closed position of the mould 10, the finger 44 of each sector is housed in the axial portion 48a of the groove and comes to stop axially against the end wall of said axial portion. A metal plate 50 is fixed to the upper coupling member 22 so as to ensure the locking of the associated sector during the opening and closing phases of the mould, as will be described in more detail below. The plate 50 is here fixed to the coupling member 22 on the side of the ring 38 of the upper portion. To ensure this locking of each sector 16 with the associated coupling member 22, magnets (not shown) are fixed to the fixing flange 16e and to the uprights 42 of said sector.

The lower coupling member 20 is fixed to the lower portion 12. The coupling member 20 is fixed to the ring 28 of the lower portion. The coupling member 20 is fixed to the outer surface (not designated) of the ring 28. The coupling member 20 comprises a guide groove 52, inside which the second finger 46 of the associated sector extends. The groove 52 comprises a vertical, rectilinear, axial portion 52a which is extended at an upper end by an oblique portion 52b that extends upward on the side opposite the ring 28. The end of the oblique portion 52b of the groove is open towards the outside. The groove 52 is oblong. The groove 52 is delimited in the width direction by two mutually facing opposite side walls, and in the length direction by an end wall situated at the level of the axial portion 52a.

In the closed position of the mould 10, the finger 46 of each sector is housed in the axial portion 52a of the groove and comes to stop axially against the end wall of said axial portion. The lower coupling member 20 also comprises a protruding portion 54 extending obliquely towards the outside, which extends the lower side wall of the oblique portion 52b of the groove.

With reference to FIGS. 5 to 10, we will now describe the opening of the mould 10. From the closed position of the mould 10 again illustrated in FIG. 5, the lower 12 and upper portions 14 move axially away from one another.

Figure 6:
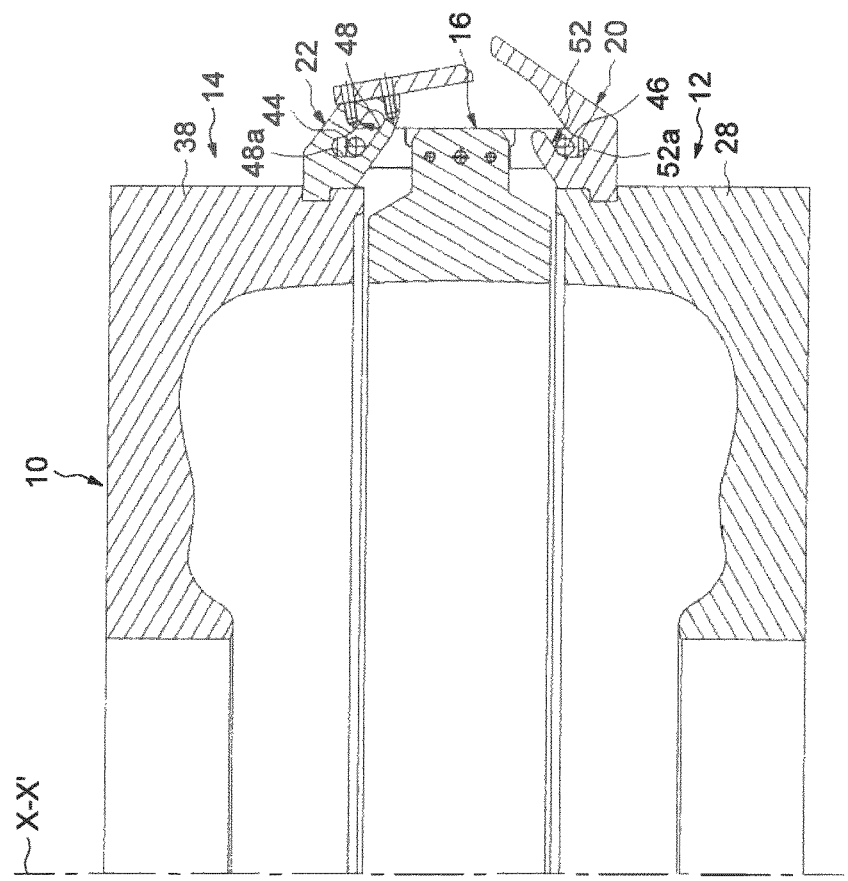
Figure 10:
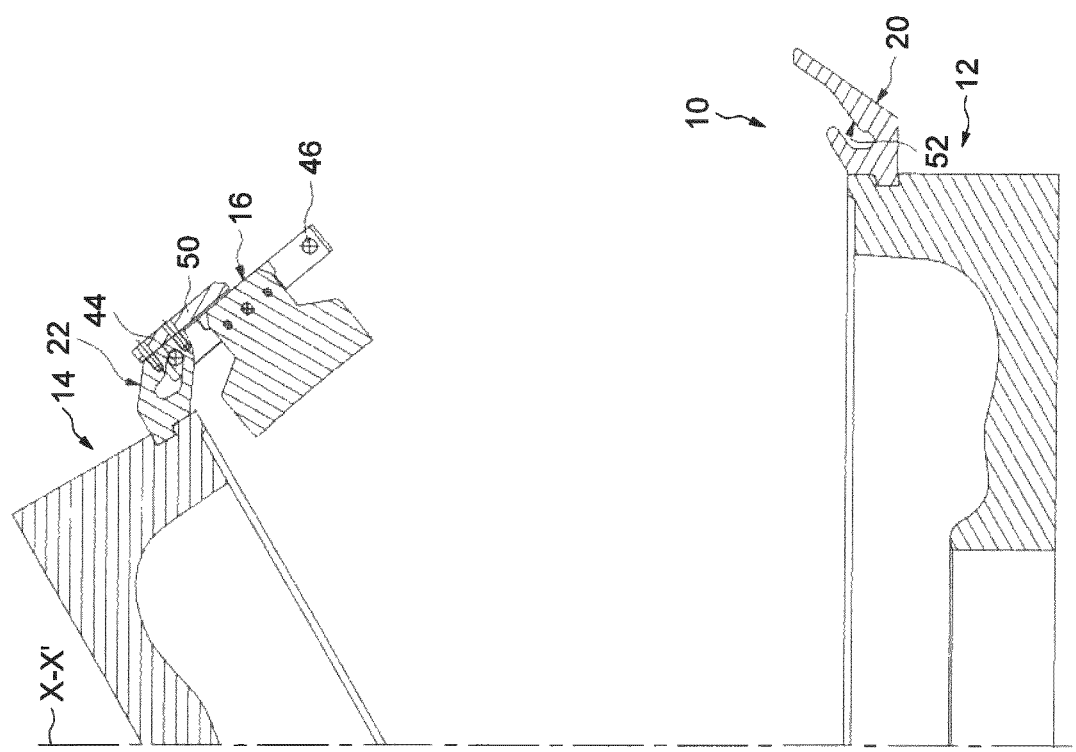

As illustrated on FIG. 6, during a first phase of this axial distancing movement, the fingers 44, 46 of each sector slide axially inside the axial portions 48a, 52a of the grooves of the coupling members 22, 20. The axial dimension of the axial portions 48a, 52a of the grooves is provided so as to ensure the disengagement of the sectors 16 from the rings 28, 38 of the lower and upper portions. When the fingers 44, 46 are situated at the end of the axial portions 48a, 52a of the grooves, the axial distancing of the lower 12 and upper portions 14 is such that a first axial spacing exists between each sector 16 and the ring 38, and a second axial spacing between each sector and the ring 28.

During this first phase of the axial distancing movement of the lower 12 and upper portions 14, no movement of the sectors 16 takes place. Each sector 16 is still in its moulding position.

Then in a following second phase of the axial distancing movement of the lower 12 and upper portions 14, the fingers 44, 46 of each sector slide inside the oblique portions 48b, 52b of the grooves of the coupling members 22, 20, as illustrated in FIG. 7. During this second phase, a radial displacement of each sector 16 takes place towards the outside from its moulding position. Each sector 16 is thus movable in the radial direction from its moulding position towards a retracted position. For information, the radial retraction of the sector 16 is of the order of 30 mm in the exemplary embodiment illustrated. It is naturally possible to provide other values for the radial displacement.

When the finger 44 of each sector bears against the end wall of the oblique portion 48b of the groove of the coupling member 22, the finger 46 of said sector is situated outside the open oblique portion 52b of the groove of the coupling member 20. In this position, each sector 16 is therefore no longer coupled to the lower portion 12 via the lower coupling member 20.

Each lower coupling member 20 thus forms a member for temporary coupling of the associated sector 16 to the lower portion 12 of the mould, the upper coupling member 22 forming a member for permanent coupling of said sector to the upper portion 14.

Then during the continued axial distancing movement of the lower 12 and upper portions 14, in a third phase, each sector 16 pivots angularly towards the outside of the mould, as illustrated in FIG. 8. The angular pivoting of each sector takes place around the finger 44 of said sector forming the pivot axis. The angular pivoting of each sector 16 is a rotation of said sector around the finger 44 in the counter-clockwise direction. For information, the angular pivoting of the sectors is of the order of 10° in the exemplary embodiment illustrated. Here too, it is also possible to provide other angular values for this pivoting.

The angular pivoting of each sector 16 becomes possible because the finger 46 of said sector is no longer engaged with the side walls delimiting the oblique portion 52b of the grooves of the lower coupling member 20. The angular pivoting of each sector 16 occurs insofar as before pivoting, the centre of gravity of the sector is radially offset towards the inside of the mould relative to the finger 44.

In the exemplary embodiment illustrated, during the angular pivoting of each sector 16 in the counter-clockwise direction, the finger 46 of said sector moves along the protruding portion 54 of the associated lower coupling member 20. This contact between the finger 46 of each sector and the associated coupling member 20 is not necessary for the angular pivoting of the sector 16 during this opening phase of the mould 10, but allows the return of said sector to its retracted, unpivoted position during a closing phase of the mould 10, as will be described in more detail below.

During pivoting of each sector 16, the uprights 42 of said sector come to rest against the metal plate 50 of the associated upper coupling member 22 in the region of the magnets mounted on said sector. This causes the locking of the sector 16 in its pivoted position by the magnetic attraction of the magnets fixed to the uprights 42 and the flange 16e of each sector.

The axial distancing of the lower 12 and upper portions 14 continues in a fourth phase, illustrated in FIG. 9. Finally, in a fifth and final phase of opening of the mould 10, illustrated in FIG. 10, the upper portion 14 pivots angularly relative to the lower portion 12 in the counter-clockwise direction up to its maximum opening position.

With reference to FIGS. 11 to 15, we will now describe the closure of the mould 10 from this maximum opening position.

Figure 11:
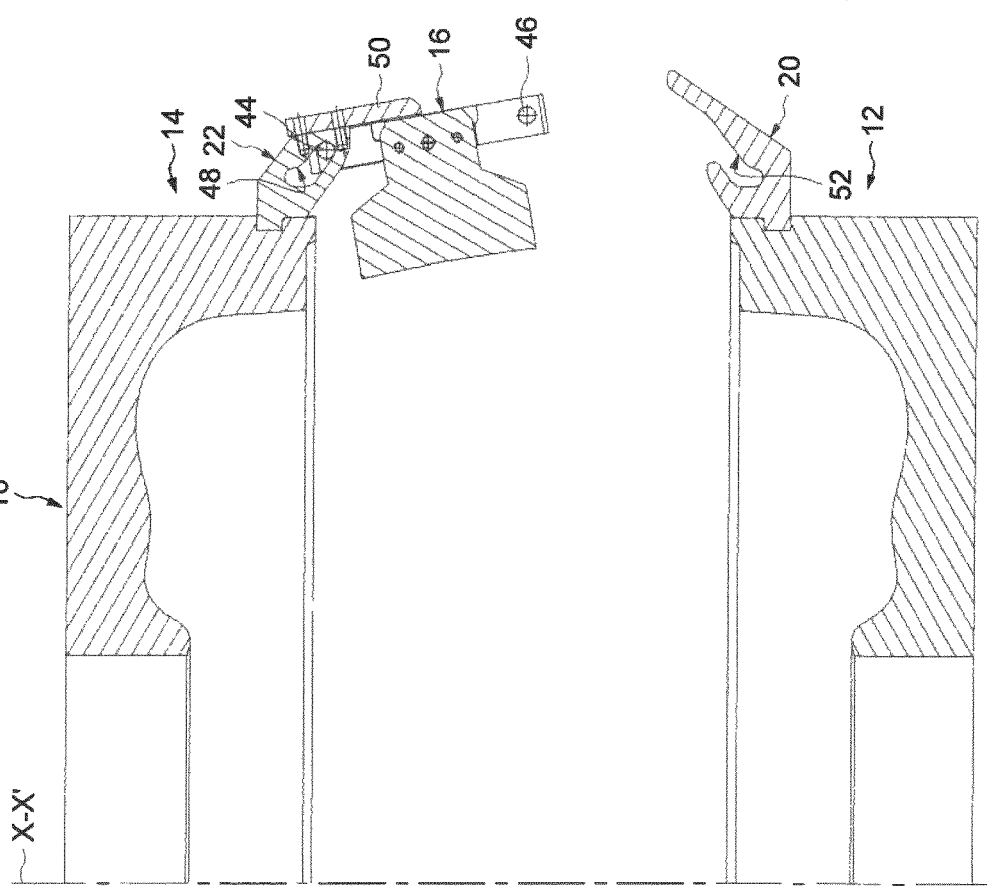

In a first phase of closure of the mould 10, illustrated in FIG. 11, the upper portion 14 pivots angularly relative to the lower portion 12 clockwise, in order to return to a position in which the two portions face one another axially.

Figure 12:
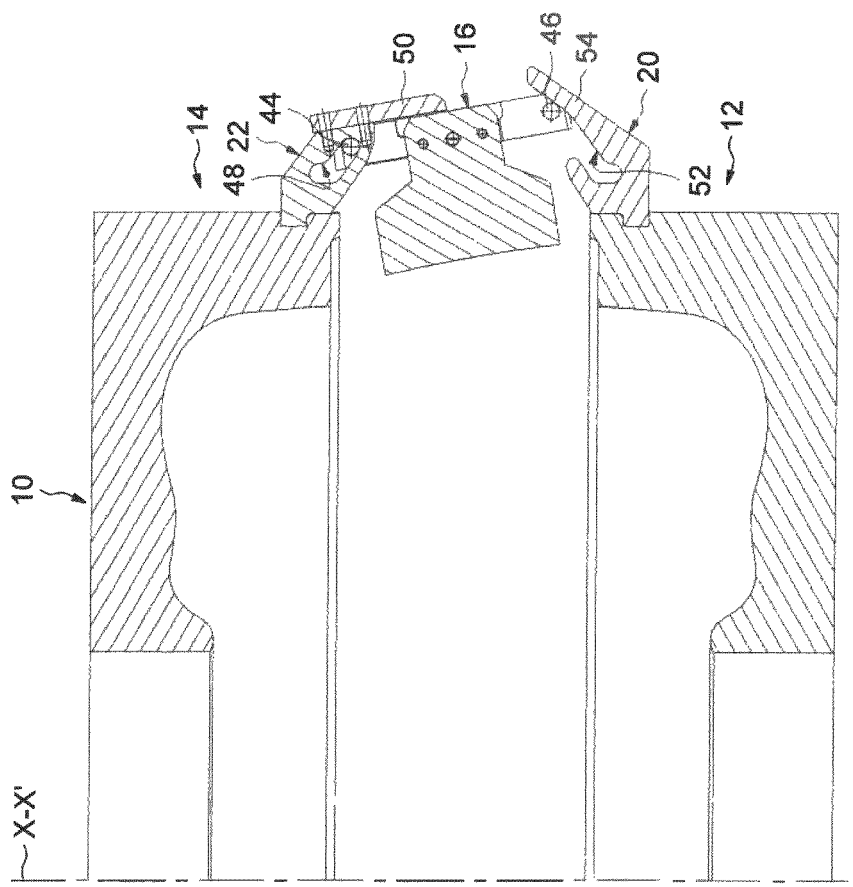
FIG. 11, FIG. 12, FIG. 13, FIG. 14 and FIG. 15 are cross-sectional views illustrating the closure of the mould.

Then in a second phase of closure of the mould 10, the lower 12 and upper portions 14 move axially closer together, as illustrated in FIG. 12. In the position shown on FIG. 12, the finger 46 of each sector comes into contact with the protruding portion 54 of the lower coupling member 20 associated with said sector.

Figure 13:
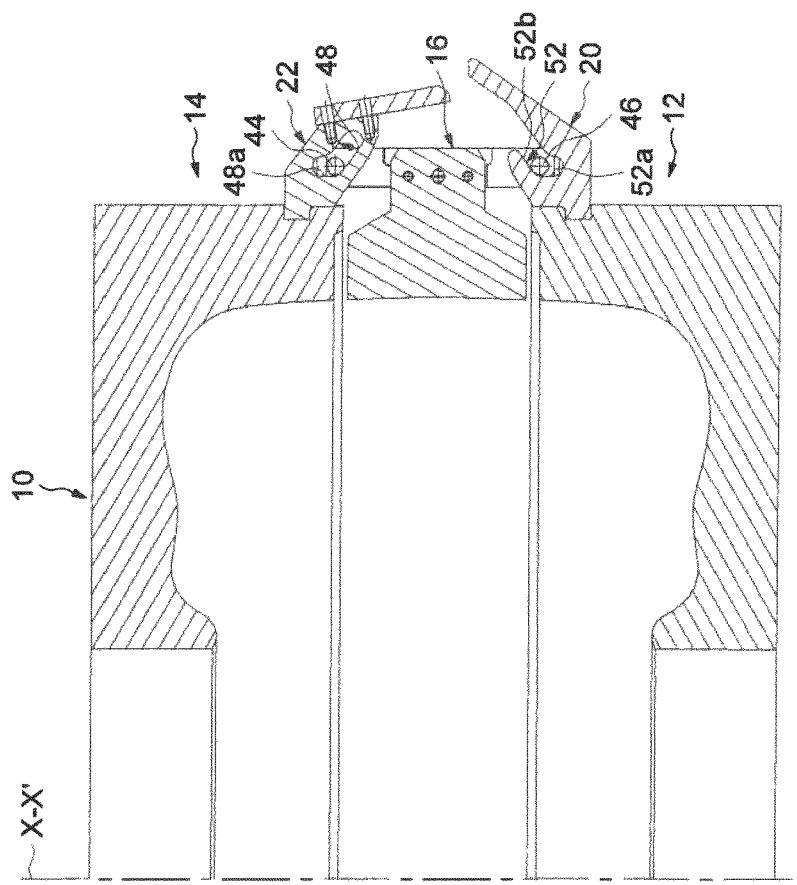

Then, during the further of axial approaching movement of the lower 12 and upper portions 14, in a third phase, each sector 16 pivots angularly towards the inside of the mould, as illustrated on FIG. 13. The angular pivoting of each sector 16 takes place under the effect of contact between the finger 46 of said sector and the protruding portion 54 of the lower coupling member 20. The angular pivoting of each sector 16 takes place in the clockwise direction around the finger 44 of said sector. Each sector 16 is thus returned to its retracted position with respect to its moulding position. During this phase of the axial approaching movement of the lower 12 and upper portions 14, the angular pivoting of each sector 16 takes place as soon the reaction force exerted on the finger 44 by the protruding portion 54 of the coupling member 20 exceeds the magnetic attraction force of the magnets of the sector.

Figure 14:
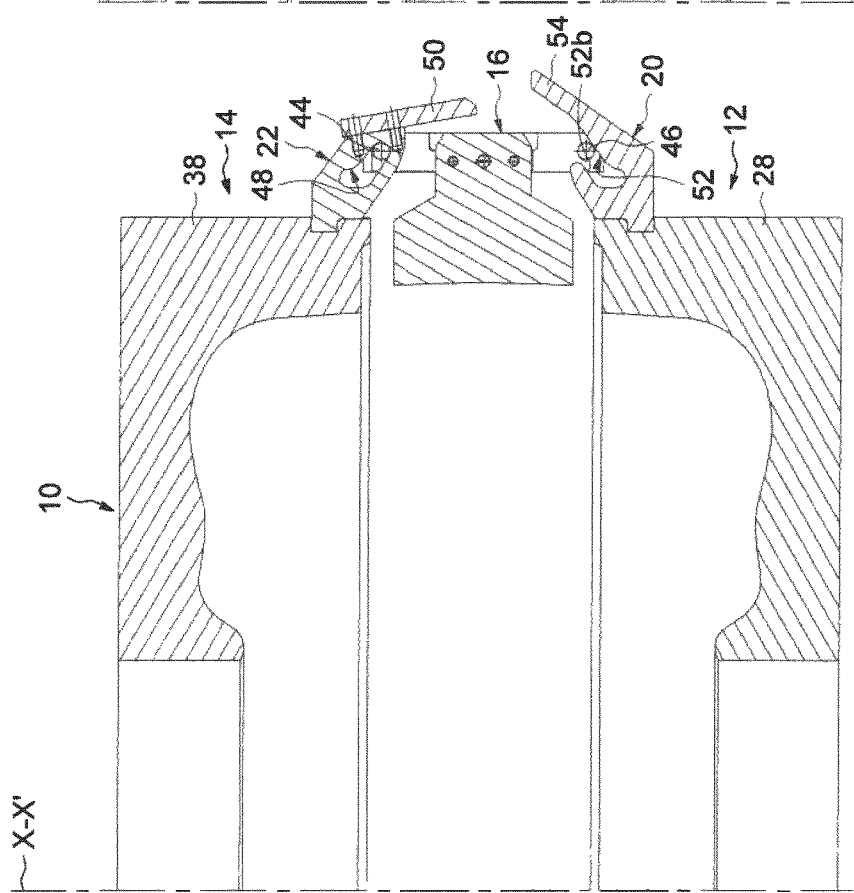

In a fourth phase of the axial approaching movement of the lower 12 and upper portions 14, the fingers 44, 46 of each sector slide inside the oblique portions 48b, 52b of the grooves of the coupling members 22, 20, as illustrated on FIG. 14. During this phase, a radial displacement of each sector 16 takes place towards the inside from its retracted position up to its moulding position. Each sector 16 is in its retracted position when the fingers 44, 46 of said sector are situated at the ends of the oblique portions 48b, 52b of the grooves connecting to the axial portions 48a, 52a.

Figure 15:
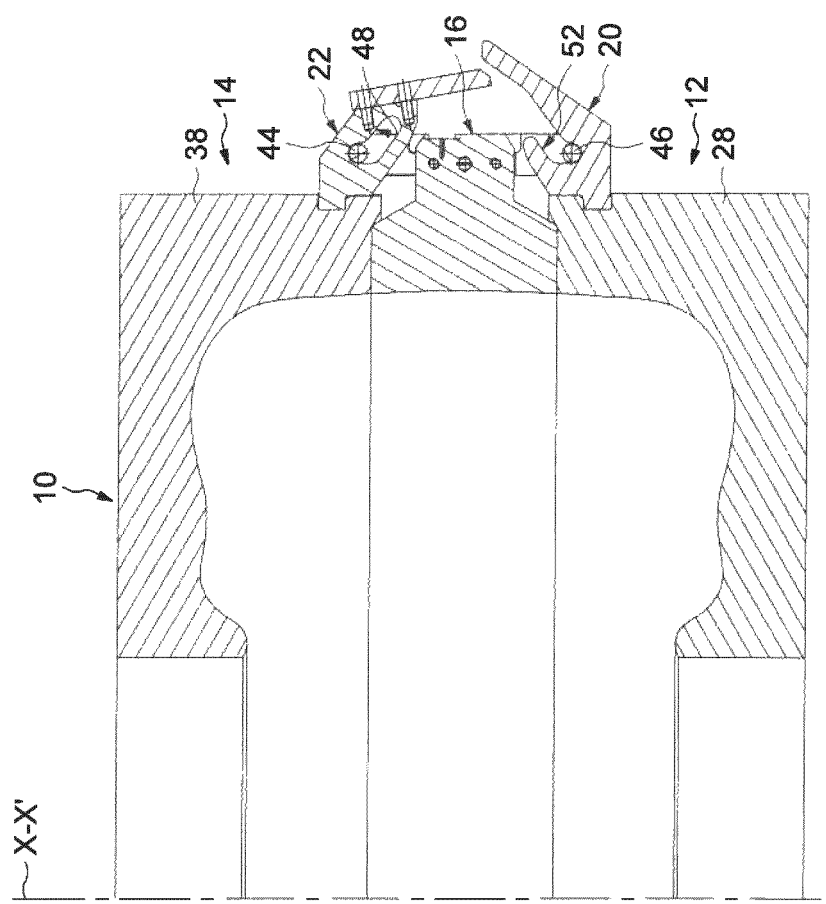

Finally, during a fifth and final phase of the axial approaching movement of the lower 12 and upper portions 14, the fingers 44, 46 of each sector slide axially inside the axial portions 48a, 52a of the grooves of the coupling members 22, 20 until the rings 28, 38 come to bear axially against the sectors 16 in the closed position of the mould, illustrated in FIG. 15.

During closure of the mould 10, the sectors 16 thus move in a reverse movement sequence to that which occurs during opening of said mould.

Also, as indicated above, in the exemplary embodiment illustrated, during the opening phase when the finger 44 of each sector is situated at the end of the oblique portion 48b of the groove of the coupling member 22, the finger 46 of said sector is situated outside the open oblique portion 52b of the groove 52 of the coupling member 20. As a variant, it would be possible to provide an elongated oblique portion 52b for the groove 52, while however ensuring that the side walls of this portion widen towards the outside so as not to later hinder the angular pivoting of the sector.

The invention has been described on the basis of a mould allowing moulding of a tyre for an agricultural vehicle. It is possible, without leaving the scope of the invention, to use such a mould with sectors for manufacture of a tyre for any land-based vehicle, including and without limitation vehicles of the types passenger vehicle, utility vehicle, heavy goods vehicle or also construction vehicle.

The invention claimed is:

1. A mold for a tire comprising a tread and two side walls, the mold comprising:
   lower and upper portions which are intended for molding at least the side walls of the tire and movable at least axially relative to one another between a close-together molding position for molding the tire and a distanced position for extracting the tire from the mold; and
   a plurality of sectors which are in axial contact with the lower and upper portions in the close-together molding position and are intended to ensure the molding of at least a central portion of the tread of the tire, the plurality of sectors being distributed in a circumferential direction and movable relative to the lower and upper portions,
   wherein, for each sector, the mold further comprises coupling members, including a permanent coupling member for permanently coupling the sector to the upper portion which is fixed to an outer surface of the upper portion and protrudes radially towards an outside relative to the upper portion, and a temporary coupling member for temporarily coupling the sector to the lower portion which is fixed to the outer surface of the lower portion and protrudes radially towards the outside relative to the lower portion, the coupling members being configured so as to obtain:
      during an axial distancing movement, providing an axial displacement, of the lower and upper portions from the close-together molding position,
      a first phase with a disengagement of the sector from the lower and upper portions such that a first axial spacing exists between the sector and the upper portion and a second axial spacing exists between the sector and the lower portion, and with no movement of the sector which is still in the close-together molding position, and
      a second phase with a radial displacement of the sector toward the outside followed by
      a third phase with an angular pivoting of the sector toward the outside under an effect of a weight of the sector, around an axis perpendicular to directions of the axial and radial displacements, and
      during an axial approaching movement of the lower and upper portions from the distanced position for extraction from the mold, reverse movements of the sector.

2. The mold according to claim 1, wherein the lower and upper portions are each provided with a support face in axial contact with a front face of each sector in the close-together molding position of the lower and upper portions, and a tapered holding face extending the support face toward an inside and radially engaged against a complementary outer face of each sector in the close-together molding position.

3. The mold according to claim 2, wherein the permanent and temporary coupling members associated with each sector are configured so as to obtain, during the axial distancing movement of the lower and upper portions from the close-together molding position, disengagement of the sector from the lower and upper portions before a radial movement toward the outside.

4. The mold according to claim 1, wherein each of the permanent and temporary coupling members associated with each sector comprises a guide groove, inside which a finger of the sector is engaged in sliding fashion and which is provided with at least one oblique portion for ensuring radial displacements of the sector.

5. The mold according to claim 4, wherein the finger of the sector engaged in the guide groove of the permanent coupling member forms a pivot axis of the sector.

6. The mold according to claim 4, wherein the at least one oblique portion of the guide groove of the temporary coupling member is open at one end.

7. The mold according to claim 4, wherein the guide groove of each of the permanent and temporary coupling members associated with each sector is also provided with an axial portion for ensuring disengagement of the sector from the lower and upper portions, the at least one oblique portion of the guide groove extending the axial portion toward the outside.

8. The mold according to claim 4, wherein the temporary coupling member associated with each sector comprises, in an extension of the at least one oblique portion of the guide groove, a protruding portion coming into contact with the finger of the sector during an axial approach of the lower and upper portions, in order to return the sector from a pivoted position.

9. The mold according to claim 1, wherein each of the lower and upper portions comprises a ring intended for molding a side portion of the tread adjacent to the central portion of the tread, the sectors being axially interposed between a ring of the lower portion and a ring of the upper portion in the close-together molding position.

10. The mold according to claim 1, wherein each permanent coupling member associated with each sector is fixed to an outer surface of the upper portion and each temporary coupling member associated with each sector is fixed to an outer surface of the lower portion.

11. The mold according to claim 9, wherein each permanent coupling member associated with each sector is fixed to an outer surface of the ring of the upper portion and each temporary coupling member associated with each sector is fixed to an outer surface of the ring of the lower portion.

12. The mold according to claim 1, further comprising at least one magnet for locking each sector in a pivoted position.

13. The mold according to claim 12, wherein the at least one magnet is a permanent magnet fixed on each sector and able to maintain the pivoted position of the sector by magnetic attraction force exerted on the permanent coupling member associated with the sector.

14. A method for molding a tire using the mold according to claim 1, the method comprising successive steps of:
- introducing an unvulcanized tire blank into the mold in the distanced position of the lower and upper portions of the mold;
- closing the mold by axially bringing together the lower and upper portions of the mold, causing an angular pivoting of the sectors in a clockwise direction followed by a radial movement of the sectors toward an inside;
- molding the tire;
- opening the mold by axially distancing the lower and upper portions of the mold, causing a radial movement of the sectors toward the outside followed by an angular pivoting of the sectors in a counter-clockwise direction; and
- extracting the molded tire from the mold.

15. A mold for a tire comprising a tread and two side walls, the mold comprising:
- lower and upper portions which are intended for molding at least the side walls of the tire and movable at least axially relative to one another between a close-together molding position for molding the tire and a distanced position for extracting the tire from the mold; and
- a plurality of sectors which are in axial contact with the lower and upper portions in the close-together molding position and are intended to ensure molding of at least a central portion of the tread of the tire, the plurality of sectors being distributed in a circumferential direction and movable relative to the lower and upper portions,
- wherein the lower and upper portions are each provided with a support face in axial contact with a front face of each sector in the close-together molding position of the lower and upper portions, and with a tapered holding face extending the support face toward an inside and radially engaged against a complementary outer face of each sector in the close-together molding position, and
- wherein, for each sector, the mold further comprises coupling members, including a permanent coupling member for permanently coupling the sector to the upper portion and fixed to the upper portion, and a temporary coupling member for temporarily coupling the sector to the lower portion and fixed to the lower portion, the coupling members being distinct from the tapered holding faces of the lower and upper portions and configured so as to obtain:
  - during an axial distancing movement, providing an axial displacement, of the lower and upper portions from the close-together molding position, a disengagement of the sector from the support faces and from the tapered holding faces of the lower and upper portions, and after the disengagement a radial displacement of the sector toward an outside followed by an angular pivoting of the sector toward the outside under an effect of a weight of the sector, around an axis perpendicular to directions of axial and radial displacement, and
  - during an axial approaching movement of the lower and upper portions from the distanced position for extraction from the mold, reverse movements of the sector.

16. A mold for a tire comprising a tread and two side walls, the mold comprising:
- lower and upper portions which are intended for molding at least the side walls of the tire and movable at least axially relative to one another between a close-together molding position for molding the tire and a distanced position for extracting the tire from the mold; and
- a plurality of sectors which are in axial contact with the lower and upper portions in the close-together molding position and are intended to ensure molding of at least a central portion of the tread of the tire, the plurality of sectors being distributed in a circumferential direction and movable relative to the lower and upper portions,
- wherein each sector comprises a fixing flange protruding radially towards an outside relative to the lower and upper portions, and guide fingers axially arranged on either side of the fixing flange,
- wherein, for each sector, the mold further comprises coupling members, including a permanent coupling member for permanently coupling the sector to the upper portion and fixed to the upper portion, and a temporary coupling member for temporarily coupling the sector to the lower portion and fixed to the lower portion, the coupling members being configured so as to obtain:
  - during an axial distancing movement, providing an axial displacement, of the lower and upper portions from the close-together molding position, a radial displacement of the sector toward the outside followed by an angular pivoting of the sector toward the outside under an effect of a weight of the sector, around a pivot axis perpendicular to directions of axial and radial displacement, and
  - during an axial approaching movement of the lower and upper portions from the distanced position for extraction from the mold, reverse movements of the sector,
- wherein each of the permanent and temporary coupling members associated with each sector comprises a guide groove, inside which one of the guide fingers of the sector is slidingly engaged and which is provided with at least one oblique portion for ensuring radial displacements of the sector, and
- wherein a finger of the sector engaged in the guide groove of the permanent coupling member forms the pivot axis of the sector.

\* \* \* \* \*